Sept. 23, 1958     E. L. BYRKETT ET AL     2,853,189
AUTOMATIC WEIGHT CONTROLLED SORTING DEVICE
Filed March 29, 1954     2 Sheets-Sheet 1
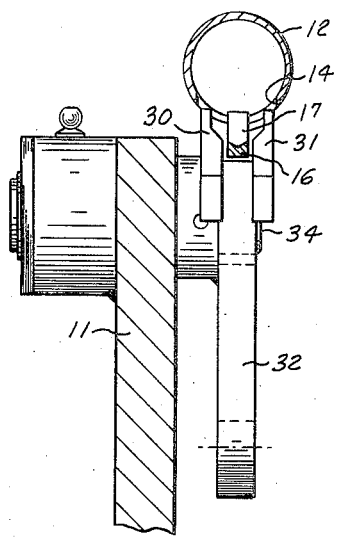
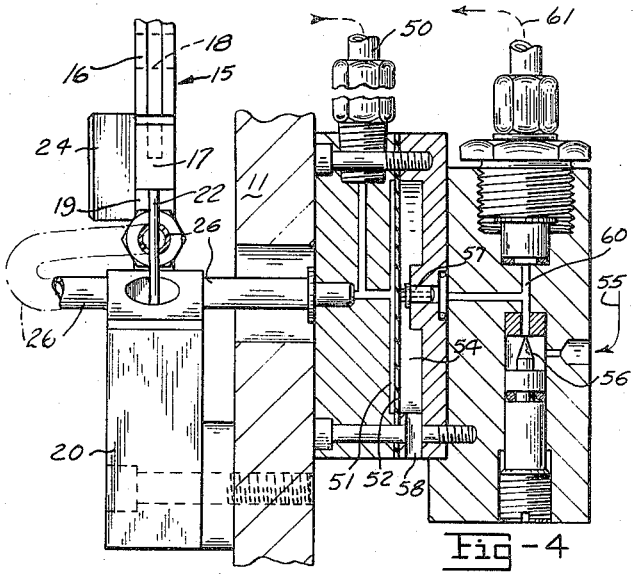
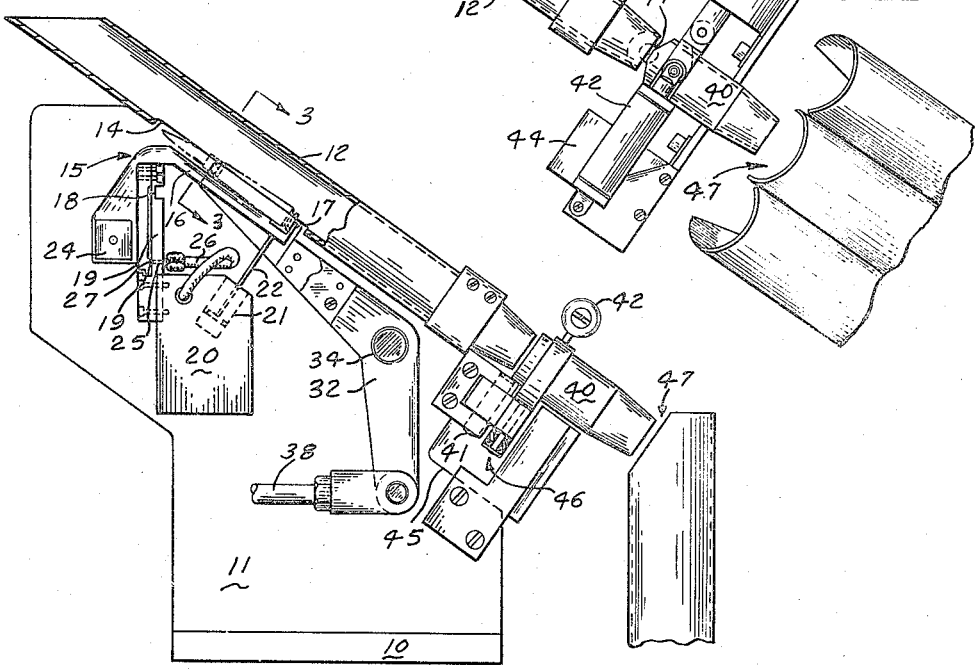
INVENTORS
Elwood L. Byrkett
Robert L. Eskin
BY
Edward J. Noé Jr.
atty Sept. 23, 1958 E. L. BYRKETT ET AL 2,853,189
AUTOMATIC WEIGHT CONTROLLED SORTING DEVICE
Filed March 29, 1954 2 Sheets-Sheet 2
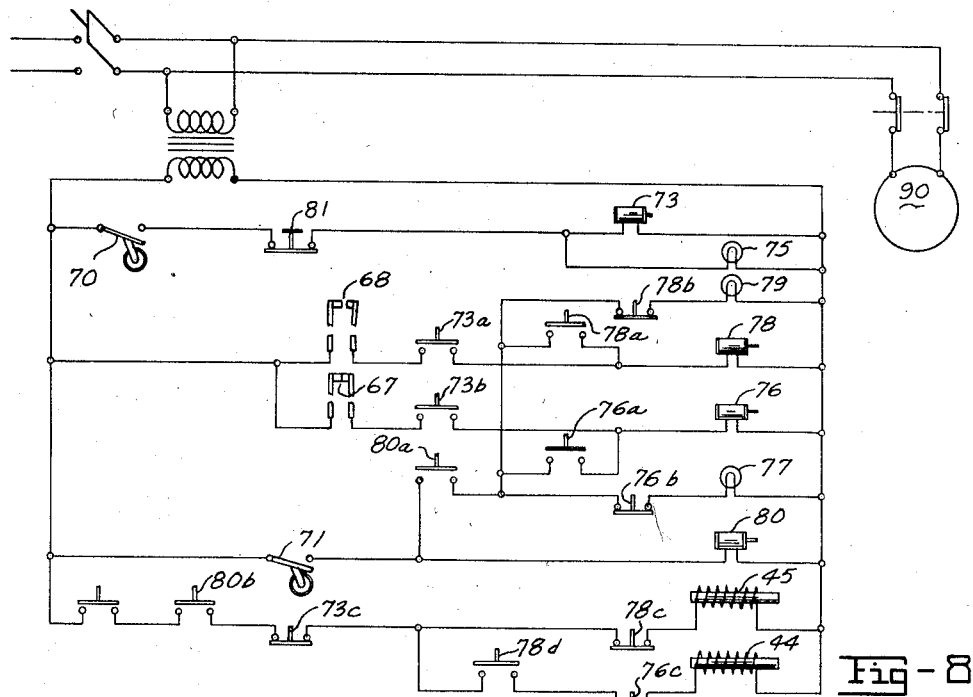
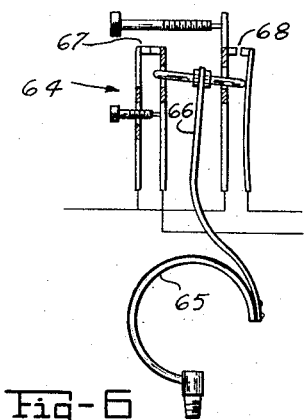
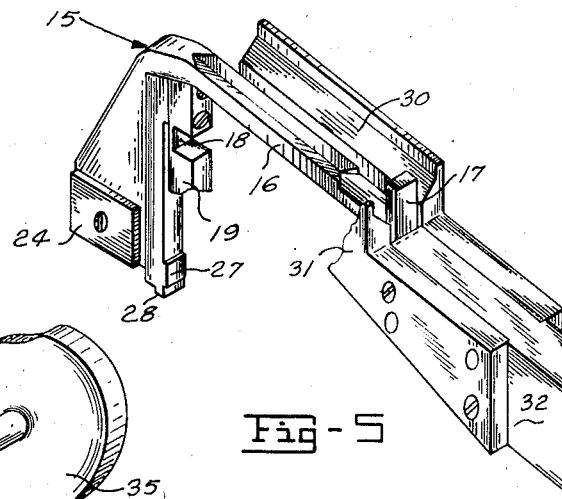
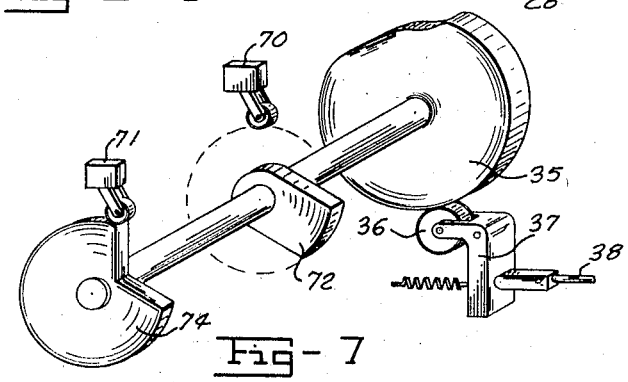
INVENTORS
Elwood L. Byrkett
BY Robert L. Eskin
Edward J. Roy Jr.
atty.

United States Patent Office 2,853,189
Patented Sept. 23, 1958

2,853,189

AUTOMATIC WEIGHT CONTROLLED SORTING DEVICE

Elwood L. Byrkett and Robert L. Esken, Dayton, Ohio, assignors, by mesne assignments, to The Sheffield Corporation, a corporation of Delaware Application March 29, 1954, Serial No. 419,344

6 Claims. (Cl. 209—121)

This invention relates to weighing apparatus.

It is an object of this invention to provide a precision weighing apparatus formed of a few simple and ruggedly conformed components and comprising a swingably mounted weighing arm cooperating with an air leakage gauging means for control of leakage in accordance with the weight of a part being weighed.

It is a further object to provide weighing apparatus of high precision involving a simple system comprising a weighing lever cooperating with and controlling an open air leakage orifice, the movements of the weighing lever being minutely limited and within the effective range of air gauging.

It is a further object to provide an apparatus for the continuous rapid weighing of parts wherein the parts are gravity fed to the weighing arm and are lifted from the weighing arm following weighing for further gravity feed, the cooperation between the weighing arm and lifting structure giving precise and rapid weighing, in an apparatus which does not involve complicated part handling or weighing structure.

It is a further object to provide a lifting member having forked portions lying along a narrow part supporting portion of a weighing arm, said forked portion being carried for movement upward relative to the arm following weighing to remove a part from the weighing arm.

It is a further object to provide such an apparatus comprising an inclined chute having an opening through the lower surface thereof, parts being fed down the chute and through the opening to the weighing arm and being lifted from the weighing arm and returned to the chute following weighing.

It is a further object to provide such an apparatus comprising distributing means at the lower end of the chute, controlled by the weighing operation and distributing the parts, by gravity, into classified weight groups.

Other objects and advantages will be apparent from the following description, the appended claims and the accompanying drawings in which, Figure 1 is a view in elevation of a weighing apparatus embodying the features of the present invention, Figure 2 illustrates the lower end of the apparatus of Figure 1 as viewed from above and perpendicular to the axis of the apparatus part carrying chute, Figure 3 is a sectional view on line 3—3 of Figure 1, Figure 4 is a vertical view, perpendicular to the plane of Figure 1, the left-hand portion showing the weighing arm and associated components in elevation and the right-hand portion being stepped inward to provide a section of a portion of the apparatus carrying plate and the amplifying structure for the weight controlled air flow, Figure 5 illustrates in fragmentary perspective the association between the part supporting weighing arm and the lifting members or fingers which cooperate with the weighing arm, Figure 6 illustrates an exemplary pressure responsive device for converting air pressure changes into electrical signals, Figure 7 illustrates a driven cam system which controls the operation of the specific disclosed apparatus, and Figure 8 is a diagrammatic representation of an electrical system responsive to the weighing operation for distributing parts into weight classification groups.

The illustrated apparatus is one which is provided for weighing cartridges and distributing them into classified groups according to weight. It will be appreciated that the features of this invention are not limited to such a restricted application or to the specific structural details of the exemplary illustrated apparatus. In the following description of this apparatus similar numerals have been employed to indicate similar apparatus components throughout the several views.

In the illustrated apparatus a part, in this application a cartridge, is fed by gravity down an inclined chute and drops through an elongated opening in the lower surface of the chute onto a weighing arm. The weighing arm is pivoted for swinging movement and controls the air leakage through an orifice in accordance with the arm movement under the influence of the cartridge being weighed. Following a timed weighing interval lifting fingers which cooperate closely with the weighing arm are raised to carry the cartridge back through the elongated opening and into the inclined chute for further gravity influenced movement down the chute to a cartridge distributing means. This distributing means is responsive to the weighing operation and comprises a chute continuation of the inclined chute which is swung to direct the cartridges into suitable receiving means distributed about the lower end of the selection chute and into weight classification groups.

The entire apparatus is carried from a base 10 through means of a vertically disposed mounting plate 11. The part carrying chute in the illustrated embodiment of the present invention is formed as an inclined tube 12 supported along the upper edge of mounting plate 11. A cartridge to be weighed is fed into the upper end of chute 12 and slides down the chute until it drops through an elongated opening 14 in the chute 12 and onto weighing arm 15. The weighing arm 15 has a narrow part receiving portion 16 which extends substantially parallel to the axis of chute 12, below and along the opening 14. The lower end of receiving portion 16 provides a stop surface 17 situated for engagement with the lower end of the cartridge being weighed and this surface 17 extends toward the axis of chute 12 immediately above the lower end of the opening 14 therethrough. The weighing arm 15 is supported for swinging movements about a reduced resilient section 18 formed in a mounting bar 19 fixed to a mounting block 20 which is in turn supported from the plate 11. A damping means for the swinging movements of arm 15 is provided at 21 in the mounting block 20 and is connected to the arm 15 by a rod 22. At the other end of arm 15 a counterbalance weight 24 is adjustably fixed thereto.

Air is supplied through a tube 26 to a leakage orifice indicated at 25 in Figure 1 from a gauging and selecting system to be later described. Flow through the orifice 25 is controlled in accordance with the swinging movements of arm 15 and the weight of a cartridge by an opposed orifice controlling surface 27 which cooperates with the orifice. Swinging movement of the orifice controlling surface away from the orifice 25 is limited to a minute movement which serves to inhibit oscillations and is within the effective range of air gauging by the cooperation between a projecting tang 28 (see Figure 5) and a transverse groove in the mounting bar 19 as seen in Figure 1.

A pair of lifting members or fingers 30 and 31 are forked about and extend closely along each side of the part receiving portion 16 of the arm 15. It will be seen in Figure 3 that these lifting fingers have a transverse overall dimension which is less than the width of the elongated opening 14 in chute 12. The vertical inward facing opposed surfaces on fingers 30 and 31 will cooperate to retain a cartridge dropped through opening 14 and onto the part receiving portion of arm 15. A longitudinal groove along the upper surface of portion 16 locates the cartridge during weighing. The cartridge being weighed has a transverse dimension substantially greater than the corresponding dimension of the part supporting portion 16 and extends to each side thereof. The lifting fingers 30 and 31 have inclined upwardly facing surfaces which engage and lift the cartridge and return it to the chute 12 for further sliding movement. The fingers 30 and 31 are mounted at the upper end of a lifting arm 32 which is pivoted about a shaft 34 for swinging movement. The arm 32 is actuated through means of a cam 35, cam follower 36, pivoted bell crank 37 and linkage 38, see Figures 1 and 7.

The lifting surfaces of lifting fingers 30 and 31 are below the cartridge during weighing. Following a weighing operation the arm 32 is actuated to raise fingers 30 and 31 and engage the cartridge. The stop surface 17 at the lower end of the part supporting portion 16 of arm 15 guides the cartridge until it is returned to the chute at which time it slides from fingers 30 and 31 into chute 12 for further movement down the chute to a selection apparatus.

At the lower end of chute 12 a selection chute 40 forms a continuation thereof and is mounted for swinging movements about the axis of a pin 41. The selection chute 40 is biased to a centered position in axial alignment with chute 12 by a conventional spring structure included in a cylinder 42. Selection solenoids 44 and 45 are linked to a connection 46 below the selection chute 40 for its movements to one side or the other as the cartridge is over or underweight. Receiving chutes as indicated generally at 47 are distributed about the lower end of selection chute 40 for receiving the cartridges in classified weight groups. For example in the illustrated apparatus cartridges within the weight tolerance are directed into the center receiving chute, overweight cartridges to one side and underweight cartridges to the other.

Air under regulated pressure is supplied through a conduit 50 for gauging the swinging movements of weighing arm 15. The pressure in chamber 51 to the left of flexible diaphragm 52 as seen in Figure 4 will be determined by the proximity of orifice controlling surface 27 to leakage orifice 25 and the resulting air flow through conduit 26, all in accordance with the cartridge weight. Air is supplied to chamber 54 at the right-hand side of diaphragm 52 from a regulated source as indicated at 55. Air from source 55 flows past an amplification regulation needle valve 56, through an orifice insert 57, against diaphragm 52 and escapes from chamber 54 to atmosphere through a passage 58. Very minute changes in the position of the center of diaphragm 52 (responsive to the weighing movements of arm 15 and the cartridge weight) will cause rather wide pressure changes in passage 60.

The amplified pressures in passage 60 are led through a connection 61 to a pressure responsive device indicated generally at 64 in Figure 6. This pressure responsive device 64, preferably, as herein shown, includes a pressure responsive element 65 operating an arm 66 controlling electrical switches 67 and 68. The pressure responsive device comprised of the elements just mentioned may be of the character disclosed in Aller Patent 2,448,653, granted September 7, 1948. The position of arm 66 in Figure 6 is as it would be if an overweight part were resting on the part supporting portion of weighing arm 15 with substantial air leakage through orifice 25 and a low pressure in pressure responsive element 65.

When a cartridge drops through the opening in chute 12 and is located to be weighed, weighing arm 15 will swing, orifice controlling surface 27 will move away from orifice 25 with an increased flow through conduit 26 and the resultant pressure changes as amplified through the structure of Figure 4 will cause arm 66 to move in a clockwise direction. If the cartridge is overweight switch 68 will open and switch 67 will be closed. However if the cartridge is underweight arm 66 will remain in a counterclockwise position to an extent so that switch 68 is closed and switch 67 is opened.

Weight responsive switches 67 and 68 as well as switches 70 and 71 actuated by cams 72 and 74 are all included in the electrical circuit of Figure 8. As cams 35, 72 and 74 rotate together lifting arm 32 and switches 70 and 71 are actuated in a predetermined timed relationship for a complete automatic gauging and selection operation.

In the electrical diagram of Figure 8 relays are indicated by numerals and the switches which they actuate by similar numerals with small letter subscripts. Under condition of cartridge overweight switch 68 is open and switch 67 is closed and in a condition of cartridge underweight switch 68 is closed and switch 67 is open. The switches as shown in the circuit diagram of Figure 8 are positioned as they would be if an overweight part were in weighing position. Cam 72 in conjunction with switch 70 controls the weighing time. When switch 70 is closed relay 73 is energized and bulb 75 is lighted, indicating that weighing is taking place. Relay 73 actuates switches 73a and 73b to close them in the circuits to the weighing relays 76 and 78 and switch 73c is opened to disable the selection solenoids 44 and 45. With switch 67 closed relay 76 is energized. Switch 76a is closed to light 79 indicating an overweight condition; switch 76b opens; and switch 76c opens in the circuit to the underweight solenoid 44. A predetermined interval after the closing of switch 70, cam 74 closes switch 71 for a predetermined selection time. Closing switch 71 energizes relay 80 which in turn closes switches 80a and 80b. Then switch 70 opens allowing switch 73c to close in the circuit to the selection solenoids and overweight solenoid 45 is energized to swing the selection chute 40 to the right as viewed in Figure 2. After switch 70 opens but before switch 71 opens, the lift arm 32 is actuated to raise the cartridge and return it to the chute. After a predetermined time interval as necessary for the cartridge to slide down chute 12, through the selection chute 40 and to the proper receiver switch 71 opens and the cycle is completed. A similar operation takes place with an underweight cartridge with the resultant actuation of solenoid 44 and the distribution of the underweight cartridge to the left hand of the receiving chutes 47. Should the part be within weight tolerance neither solenoid is actuated because both switches 67 and 68 will be closed. A cartridge within the weight tolerance will slide directly down the centered selection chute 40 into the middle of the receivers 47. Switch 81 can be manually actuated to deenergize relay 73. Electric motor 90 is energized from the main line and rotates the shaft supported cams 35, 72 and 74.

Because of the cooperation of the swingingly mounted weighing arm and the air leakage orifice gauging structure precision weighing of parts is possible in a device which comprises a few simple and ruggedly conformed components. Through the cooperation of the inclined chute, the weighing arm, and the lifting fingers, it is possible to rapidly weigh parts without involving a highly complex handling system or a delicate or complicated weighing structure. Through the cooperation of the weighing structure, the part handling system and the selection means the present invention will have utility as a unitary weighing apparatus or for situation in a comprehensive part gauging system as a weighing station; parts being supplied through an escapement mechanism or the like to the upper end of the inclined chute.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A weighing apparatus comprising, a base, an inclined chute carried from said base, said chute having an opening in the lower surface thereof, a weighing arm extending along said chute and below said opening having part retaining means for receiving a part fed by gravity down the upper portion of said chute and dropping through the opening, support means mounted on said base and carrying said arm for swinging movement about a pivot axis transverse to the arm and the chute in weighing, gauging means carried from said base and responsive to the movement of the arm in weighing and the part weight, a pair of lifting arms, means supporting said lifting arms, one on each side of said weighing arm extending therealong and closely adjacent thereto, and actuating means connected to the lifting arm supporting means for raising said lifting arms relative to said weighing arm and lifting the part from the weighing arm and returning it to the chute following weighing.

2. A weighing apparatus comprising, a base, an inclined chute carried from said base, said chute having an opening in the lower surface thereof, a weighing arm extending substantially parallel to said chute and closely adjacent and below said opening having part retaining means for receiving a part fed by gravity down the upper portion of said chute and dropping through the opening, said part retaining means comprising stop means for engaging the lower end of a part, said stop means being disposed adjacent to but above the lower end of the chute opening, support means mounted on said base and carrying said arm for swinging movement about a pivot axis transverse to the arm and the chute in weighing, gauging means carried from said base and responsive to the movement of the arm in weighing and the part weight, a pair of lifting arms, means supporting said lifting arms, one on each side of said weighing arm extending therealong and closely adjacent thereto, and actuating means connected to the lifting arm supporting means for raising said lifting arms relative to said weighing arm and lifting the part from the weighing arm and returning it to the chute following weighing, the stop means serving to prevent downward sliding of a part until it has been lifted above the stop means and into the chute.

3. A weighing apparatus comprising, a base, an inclined chute carried from said base having an elongated opening in its lower surface, a weighing arm carried from said base for swinging movement in weighing about horizontal axis transverse to said chute, said arm having an inclined part receiving portion extending substantially parallel to said chute along and below the chute opening, the part receiving portion having a width substantially less than the corresponding dimension of a part to be weighed, said weighing arm having a lower stop means extending from the part receiving portion and toward the chute immediately above the lower end of the chute opening, gauging means carried from said base and responsive to the movement of the arm in weighing and the weight of a part fed by gravity and dropping through the opening with its lower end engaging said stop means, a pair of lifting arms, means supporting said lifting arms for swinging movement together, one on each side of the part receiving portion of said weighing arm, extending therealong and closely adjacent, each having upward facing planar part engaging surfaces, the overall transverse dimension of said lifting arms being less than the corresponding dimension of the chute opening, and actuating means connected to the lifting arm supporting means for raising said lifting arms relative to said weighing arm and lifting a part from the weighing arm into an inclined position within the chute, whereby the part slides from the planar part engaging lifting arm surfaces into the chute when its lower end clears the weighing arm lower stop means.

4. A weighing apparatus comprising a base, an inclined carrying chute carried from said base, said carrying chute having an elongated opening in the lower surface thereof, a weighing arm extending along said carrying chute and below said opening and having part retaining means for receiving a part fed by gravity down the upper portion of said chute and dropping through the opening, support means mounted on said base and carrying said arm for swinging movements about a pivot axis transverse to the arm and carrying chute in weighing, gauging means carried from said base and responsive to the movement of the arm in weighing, a pair of lifting arms, means supporting said lifting arms one on each side of said weighing arm extending therealong and closely adjacent thereto, actuating means connected to the lifting arm supporting means for raising said lifting arms relative to said weighing arm and lifting a part from the weighing arm and returning it to the carrying chute following weighing, a distributing chute at the lower end of the part carrying chute and forming a continuation thereof, means mounting said distributing chute at its upper end adjacent the lower end of the part carrying chute for swinging movements to either side of an intermediate position in line with the carrying chute and about a pivot axis perpendicular to the axis of the part carrying chute, the pivot axis lying in a vertical plane, actuating means connected to said distributing chute, control means interconnecting said gauging means and said actuating means to swing the distributing chute in accordance with the part weight, and receiving means disposed about the lower end of the distributing chute to receive parts in classified weight groups.

5. A weighing apparatus comprising, a base, inclined chute means carried from said base having an upper supply portion and a lower receiving portion, a weighing member positioned for receiving parts delivered down said chute supply portion and carried from said base for generally up and down movement in weighing, said member including upwardly projecting stop means fixed against movement relative thereto to limit further movement of the part down the chute means and position it on the member for weighing, means cooperating between said base and said member responsive to the weight of the part, and lift means cooperating with said weighing member for lifting a part from said member and over the stop means to the receiving chute portion for continued movement by gravity following weighing.

6. A weighing apparatus comprising, a base, an inclined chute carried from said base, said chute having an opening in the lower surface thereof, a weighing arm extending along said chute and below said opening for receiving a part fed by gravity down the upper portion of the chute and dropping through the opening, support means on said base carrying said arm for swinging movement in weighing, said arm having a lower projecting stop means fixed against movement relative thereto positioned for engaging the part and limiting its further movement during weighing, means cooperating between the base and arm responsive to the movement of the arm and the part weight, and lift means cooperating with said arm for raising the part over the projecting stop and returning it to the chute for continued movement by gravity following weighing.

References Cited in the file of this patent

UNITED STATES PATENTS

| 1,835,186 | Schoonenberg | Dec. 8, 1931 |
| 2,169,897 | Lueckel | Aug. 15, 1939 |
| 2,246,597 | Niederer et al. | June 24, 1941 |
| 2,408,842 | Garretson et al. | Oct. 8, 1946 |
| 2,488,037 | Rupley | Nov. 15, 1949 |
| 2,634,081 | Knobel | Apr. 7, 1953 |